(12) United States Patent
Lee et al.

(10) Patent No.: US 12,327,191 B2
(45) Date of Patent: Jun. 10, 2025

(54) METHOD AND APPARATUS WITH NEURAL NETWORK PRUNING

(71) Applicant: SAMSUNG ELECTRONICS CO., LTD., Suwon-si (KR)

(72) Inventors: Won-Jo Lee, Suwon-si (KR); Youngmin Oh, Suwon-si (KR); Minkyoung Cho, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1086 days.

(21) Appl. No.: 17/236,503

(22) Filed: Apr. 21, 2021

(65) Prior Publication Data

US 2022/0114453 A1 Apr. 14, 2022

(30) Foreign Application Priority Data

Oct. 13, 2020 (KR) ........................ 10-2020-0132151

(51) Int. Cl.
*G06N 3/08* (2023.01)
*G06F 18/21* (2023.01)
(Continued)

(52) U.S. Cl.
CPC .......... *G06N 3/082* (2013.01); *G06F 18/217* (2023.01); *G06V 10/751* (2022.01)

(58) Field of Classification Search
None
See application file for complete search history.

(56) References Cited

U.S. PATENT DOCUMENTS

| | | | |
|---|---|---|---|
| 6,408,227 B1 * | 6/2002 | Singhvi | G05B 13/027 700/32 |
| 7,080,053 B2 | 7/2006 | Adams et al. | |

(Continued)

FOREIGN PATENT DOCUMENTS

| | | |
|---|---|---|
| CN | 109002889 A | 12/2018 |
| CN | 110874631 A | 3/2020 |

(Continued)

OTHER PUBLICATIONS

Sabo et al. "A new pruning algorithm for neural network dimension analysis", 2008 IEEE, pp. 3313-3318.*

(Continued)

*Primary Examiner* — Maikhanh Nguyen
(74) *Attorney, Agent, or Firm* — NSIP Law (57) ABSTRACT

A neural network pruning method includes acquiring a first task accuracy of an inference task processed by a pretrained neural network, pruning, based on a channel unit, the neural network by adjusting weights between nodes of channels based on a preset learning weight and based on a channel-by-channel pruning parameter corresponding to a channel of each of a plurality of layers of the pretrained neural network, updating the learning weight based on the first task accuracy and a task accuracy of the pruned neural network, updating the channel-by-channel pruning parameter based on the updated learning weight and the task accuracy of the pruned neural network, and repruning, based on the channel unit, the pruned neural network based on the updated learning weight and based on the updated channel-by-channel pruning parameter.

17 Claims, 6 Drawing Sheets

(51) Int. Cl.
*G06N 3/082* (2023.01)
*G06V 10/75* (2022.01)

(56) References Cited

U.S. PATENT DOCUMENTS

| | | | | |
|---|---|---|---|---|
| 10,657,426 | B2* | 5/2020 | Georgiadis | G06V 10/82 |
| 10,832,135 | B2* | 11/2020 | Ji | G06N 3/082 |
| 11,250,325 | B2* | 2/2022 | Deng | G06N 3/045 |
| 11,449,756 | B2* | 9/2022 | Deng | G06N 3/042 |
| 11,475,308 | B2* | 10/2022 | Georgiadis | G06N 3/082 |
| 12,045,723 | B2* | 7/2024 | Cho | G06N 3/04 |
| 2016/0143543 | A1* | 5/2016 | Zhang | A61B 5/021 600/485 |
| 2018/0114114 | A1* | 4/2018 | Molchanov | G06N 3/045 |
| 2018/0181867 | A1 | 6/2018 | Seibold et al. | |
| 2019/0050735 | A1* | 2/2019 | Ji | G06N 3/047 |
| 2020/0169565 | A1* | 5/2020 | Badawy | G06F 21/552 |
| 2020/0184333 | A1* | 6/2020 | Oh | G06N 3/044 |

FOREIGN PATENT DOCUMENTS

| | | |
|---|---|---|
| CN | 110969240 A | 4/2020 |
| KR | 10-2018-0037558 A | 4/2018 |
| KR | 10-2018-0092810 A | 8/2018 |
| KR | 10-2020-0070831 A | 6/2020 |

OTHER PUBLICATIONS

Siebel et al. "Efficient Neural Network Pruning during Neuro-Evolution", 2009 IEEE, 8 pages.*
Ashouri, Amir H, et al.: "Retraining-free methods for fast on-the-fly pruning of convolutional neural networks" *Neurocomputing, Elsevier, Amsterdam, NL*, vol. 370, Sep. 2, 2019, pp. 56-69.
Pietron, Marcin, et al.: "Retrain or Not Retrain?—Efficient Pruning Methods of Deep CNN Networks" *IN: Krzhizhanovskaya V.V. et al.: ICCS 2020, LNCS 12139, Springer*, Jun. 15, 2020 pp. 452-463.
Extended European Search Report issued on Feb. 4, 2022 in counterpart European Patent Application No. 21187186.8 (9 pages in English).

* cited by examiner

METHOD AND APPARATUS WITH NEURAL NETWORK PRUNING

CROSS-REFERENCE TO RELATED APPLICATIONS

This application claims the benefit under 35 USC § 119(a) of Korean Patent Application No. 10-2020-0132151, filed on Oct. 13, 2020, in the Korean Intellectual Property Office, the entire disclosure of which is incorporated herein by reference for all purposes.

BACKGROUND

1. Field

The following description relates to a method and apparatus with neural network pruning.

2. Description of Related Art

An artificial neural network may be a computational architecture. Input data may be analyzed and valid information may be extracted using neural network devices.

An artificial neural network device may use a large computational amount for processing complex input data. As a learning amount of the artificial neural network increases, the connectivity that constitutes the artificial neural network may become complex. In addition, an accuracy of old learning data increases and confidence of an estimate value of new data may degrade. That is, an overfitting issue may occur. Also, the complexity of the artificial neural network may increase and a memory allocation amount may excessively increase accordingly, which may cause an issue in terms of miniaturization and commercialization.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a neural network pruning method includes: acquiring a first task accuracy of an inference task processed by a pretrained neural network; pruning, based on a channel unit, the neural network by adjusting weights between nodes of channels based on a preset learning weight and based on a channel-by-channel pruning parameter corresponding to a channel of each of a plurality of layers of the pretrained neural network; updating the learning weight based on the first task accuracy and a task accuracy of the pruned neural network; updating the channel-by-channel pruning parameter based on the updated learning weight and the task accuracy of the pruned neural network; and repruning, based on the channel unit, the pruned neural network based on the updated learning weight and based on the updated channel-by-channel pruning parameter.

The channel-by-channel pruning parameter may include a first parameter used to determine a threshold of pruning.

The pruning may include pruning a channel among the channels in which channel elements occupy 0 at a ratio of a threshold or more, among the channels.

The updating of the learning weight may include updating the learning weight such that the task accuracy of the pruned neural network increases, in response to the task accuracy of the pruned neural network being less than the first task accuracy.

The method may include repeatedly performing a pruning-evaluation operation of determining a task accuracy of the repruned neural network and a learning weight of the repruned neural network.

The method may include determining whether to additionally perform the pruning-evaluation operation based on a preset epoch and the task accuracy of the repruned neural network.

The method may include: comparing the determined learning weight to a lower limit threshold of the learning weight, in response to repeatedly performing the pruning-evaluation operation; and determining whether to terminate a current pruning session and to initiate a subsequent pruning session in which the learning weight is set as an initial reference value, based on a result of the comparing.

A non-transitory computer-readable storage medium may store instructions that, when executed by a processor, configure the processor to perform the method.

In another general aspect, a neural network pruning apparatus includes: a processor configured to: acquire a first task accuracy of an inference task processed by a pretrained neural network; prune, based on a channel unit, the neural network by adjusting weights between nodes of channels based on a preset learning weight and based on a channel-by-channel pruning parameter corresponding to a channel of each of a plurality of layers of the pretrained neural network; update the learning weight based on the first task accuracy and a task accuracy of the pruned neural network; update the channel-by-channel pruning parameter based on the updated learning weight and the task accuracy of the pruned neural network; and reprune, based on the channel unit, the pruned neural network based on the updated learning weight and based on the updated channel-by-channel pruning parameter.

The channel-by-channel pruning parameter may include a first parameter used to determine a threshold of pruning.

For the pruning, the processor may be configured to prune a channel among the channels in which channel elements comprised in the channel occupy 0 at a ratio of a threshold or more, among the channels.

For the updating of the learning weight, the processor may be configured to update the learning weight such that the task accuracy of the pruned neural network increases in response to the task accuracy of the pruned neural network being less than the first task accuracy.

The processor may be configured to repeatedly perform a pruning-evaluation operation of determining a task accuracy of the repruned neural network and a learning weight of the repruned neural network.

The processor may be configured to determine whether to additionally perform the pruning-evaluation operation based on a preset epoch and the task accuracy of the repruned neural network.

The processor may be configured to compare the determined learning weight to a lower limit threshold of the learning weight in response to repeatedly performing the pruning-evaluation operation, and to determine whether to terminate a current pruning session and to initiate a subsequent pruning session in which the learning weight is set as an initial reference value based on a result of the comparing.

The apparatus may include a memory storing instructions that, when executed by the processor, configure the processor to perform the acquiring of the first task accuracy, the pruning of the neural network, the updating of the learning weight, the updating of the channel-by-channel pruning parameter, and the repruning of the pruned neural network.

In another general aspect, a neural network pruning method includes: for each of channels of a pretrained neural network, pruning weights of the channel based on a pruning parameter of the channel and a learning weight; updating the learning weight based on a comparison of a first accuracy of an inference performed using the pretrained neural network and a second accuracy of an inference performed using the pruned neural network; for each of the channels, updating the pruning parameter of the channel based on the updated learning weight and the second accuracy; and for each of the channels, repruning the weights of the channel based on the updated pruning parameter of the channel and the updated learning weight.

The updating of the learning weight may include updating the learning weight based on whether the second accuracy is greater than the first accuracy.

The updating of the learning weight may include: decreasing the learning weight in response to the second accuracy being greater than the first accuracy; and increasing the learning weight in response to the second accuracy being less than or equal to the first accuracy.

The pruning of the weights may include: determining values of a weight conversion function based on the pruning parameter; and pruning the weights based on the values of the weight conversion function.

The pruning of the weights may include pruning a greater amount of the weights in response to the learning weight a first value than in response to the learning weight being a second value less than the first value.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art, after an understanding of the disclosure of this application, may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Although terms of "first" or "second" are used to explain various members, components, regions, layers, or sections, the members, components, regions, layers, or sections are not limited to the terms. These terms should be used only to distinguish one member, component, region, layer, or section from another member, component, region, layer, or section. For example, a "first" member, component, region, layer, or section referred to in examples described herein may be referred to as a "second" member, component, region, layer, or section, or similarly, and the "second" member, component, region, layer, or section may be referred to as the "first" member, component, region, layer, or section within the scope of the right according to the concept of the present disclosure.

Throughout the specification, it will be understood that when a component or element is referred to as being "on," "connected to" or "coupled to" another component or element, it may be directly on, connected to, or coupled to the other component or element, or there may be one or more intervening elements therebetween. In contrast, when a component or element is referred to as being "directly on," "directly connected to," or "directly coupled to" another component or element, there are no intervening components or elements present. Likewise, expressions, for example, "between" and "immediately between" and "adjacent to" and "immediately adjacent to" may also be construed as described in the foregoing.

The terminology used herein is for the purpose of describing particular examples only and is not to be limiting of the present disclosure. As used herein, the singular forms "a", "an", and "the" are intended to include the plural forms as well, unless the context clearly indicates otherwise. As used herein, the term "and/or" includes any one and any combination of any two or more of the associated listed items. As used herein, the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms including technical or scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and the present disclosure, and will not be interpreted in an idealized or overly formal sense unless expressly so defined herein.

Hereinafter, examples will be described in detail with reference to the accompanying drawings, and like reference numerals in the drawings refer to like elements throughout.

Examples may be implemented as various types of products, such as, for example, a data center, a server, a personal computer (PC), a laptop computer, a tablet computer, a smartphone, a television, a smart electronic device, a smart vehicle, a kiosk, and a wearable device. Hereinafter, the examples are described with reference to the accompanying drawings. Like reference numerals refer to like elements throughout, although they are illustrated in different drawings.

A method and apparatus of one or more embodiments may perform compression while maintaining performance of a neural network and reducing system cost in implementing the neural network.

Figure 1:
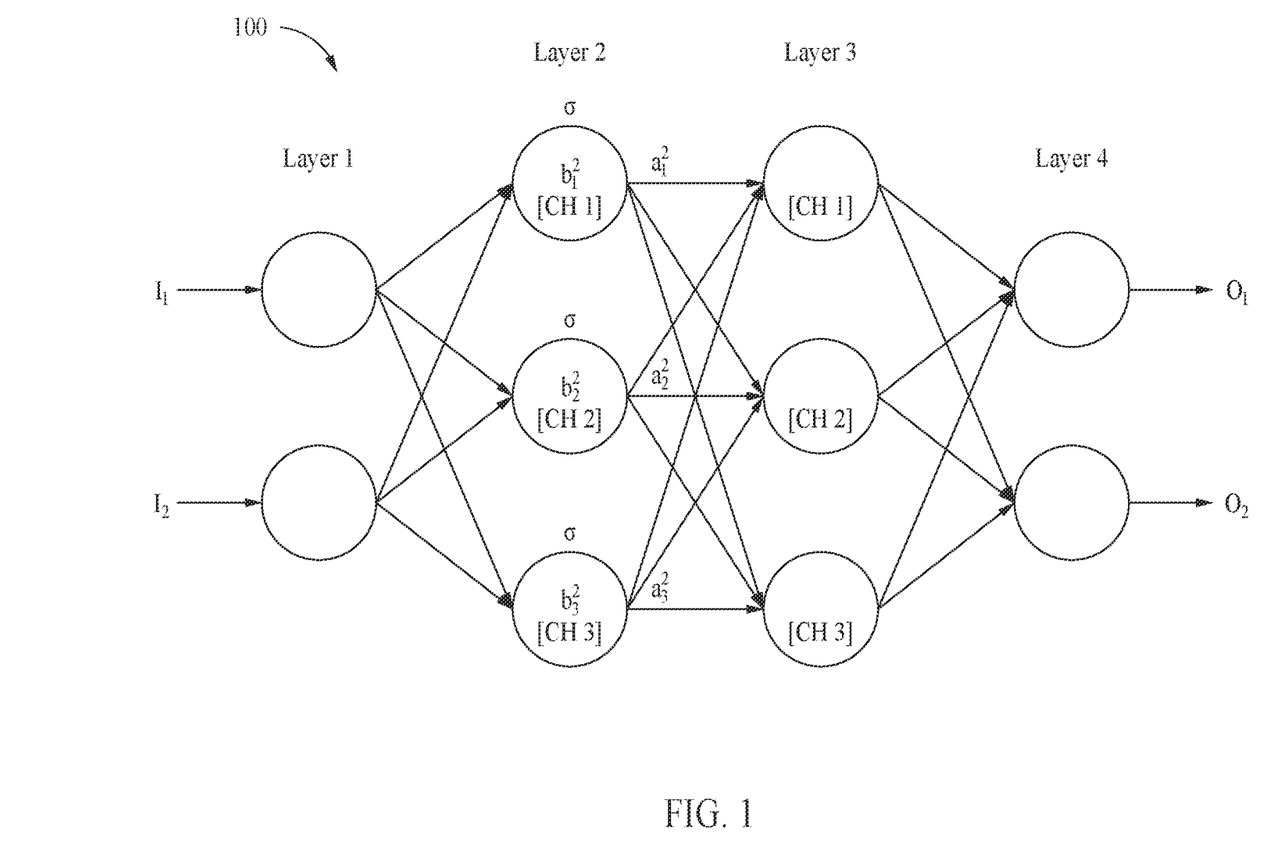
FIG. 1 illustrates an example of an operation performed in an artificial neural network.

FIG. 1 illustrates an example of an operation performed in an artificial neural network.

The artificial neural network may be a computational system that implements an information processing method. While the neural network may be referred to as an "artificial" neural network, such reference is not intended to impart any relatedness with respect to how the neural network architecture computationally maps or thereby intuitively recognizes information and how a human's nodes operate. I.e., the term "artificial neural network" is merely a term of art referring to the hardware implementation of the neural network.

A deep neural network (DNN) may include a plurality of layers as one of methods that implement the artificial neural network. For example, the DNN may include an input layer configured to receive input data, an output layer configured to output a result value derived through input data-based prediction based on learning, and a plurality of hidden layers provided between the input layer and the output layer.

The DNN may be classified into a convolutional neural network (CNN), a recurrent neural network (RNN), and the like, based on an algorithm used to process information.

A method of training the artificial neural network may be referred to as deep learning. Various algorithms, for example, a CNN scheme and an RNN scheme, may be used for deep learning.

Here, training the artificial neural network may represent determining and updating a weight and a bias between layers or a weight and a bias between a plurality of nodes belonging to different layers among adjacent layers.

For example, a plurality of hierarchical structures and a plurality of layers or a weight and a bias between a plurality of nodes may be collectively referred to as connectivity of the artificial neural network. Therefore, training the artificial neural network may represent constructing and learning the connectivity.

Referring to FIG. 1, an artificial neural network 100 may include an input layer, hidden layers, and an output layer, and may perform an operation based on received input data (for example, $I_1$ and $I_2$) and generate output data (for example, $O_1$ and $O_2$) based on a result of the performing.

The artificial neural network 100 may be a DNN or an n-layer artificial neural network that includes one or more hidden layers. For example, referring to FIG. 1, the artificial neural network 100 may be a DNN that includes an input layer (Layer 1), one or more hidden layers (Layer 2 and Layer 3), and an output layer (Layer 4). The DNN may include a CNN, an RNN, a deep belief network (DBN), a restricted Boltzmann machine (RBM), and the like. However, it is provided as an example only.

When the artificial neural network 100 is implemented as a DNN architecture, the artificial neural network 100 may include more layers capable of processing valid information. Therefore, the artificial neural network 100 may process complex data sets compared to an artificial neural network including a single layer. Although FIG. 1 illustrates that the artificial neural network 100 includes four layers, it is provided as an example only. The artificial neural network 100 may include a greater or smaller number of layers or may include a greater or smaller number of channels. FIG. 1, the artificial neural network 100 may include layers in various structures different from the structure of FIG. 1.

Each of the layers included in the artificial neural network 100 may include a plurality of channels. The plurality of channels may correspond to a plurality of nodes, processing elements (PEs), or terms similar thereto. For example, referring to FIG. 1, Layer 1 may include two channels (nodes), and each of Layer 2 and Layer 3 may include three channels. However, it is provided as an example only. Each of the layers included in the artificial neural network 100 may include various numbers of channels (nodes).

Channels included in each of the layers of the artificial neural network 100 may be interconnected and process data. For example, a single channel may receive data from other channels and may perform an operation, and may output an operation result to other channels.

Input and output of each of the channels may be referred to as an input activation and an output activation, respectively. That is, an activation may be a parameter that corresponds to output of a single channel and, at the same time, input of channels included in a subsequent layer. Each of the channels may determine its activation based on activations received from channels included in a previous layer, a weight, and a bias. The weight may be a parameter used to calculate an output activation of each channel and a value allocated to a connection relation between channels.

Each of the channels may be processed by a computational unit or a processing element configured to receive input and output an output activation. Input and output of each of the channels may be mapped. For example, when a denotes an activation function, $w_{jk}^i$ denotes a weight from a $k^{th}$ node included in an $(i-1)^{th}$ layer to a $j^{th}$ node included in an $i^{th}$ layer, $b_j^i$ denotes a bias value of the $j^{th}$ node included in the $i^{th}$ layer, and $a_j^i$ denotes an activation of the $j^{th}$ node of the $i^{th}$ layer, the activation $a_j^i$ may be represented as the following Equation 1.

$$a_j^i = \sigma\left(\sum_k (w_{jk}^i \times a_k^{i-1}) + b_j^i\right) \qquad \text{Equation 1}$$

Referring to FIG. 1, an activation of a first channel (CH1) of a second layer (Layer 2) may be represented as $a_1^2$. Also, $a_1^2$ may have value of $a_1^2 = \sigma(w_{1,1}^2 \times a_1^1 + w_{1,2}^2 \times a_2^1 + b_1^2)$ according to Equation 1. The aforementioned Equation 1 is provided as an example only to describe an activation, a weight, and a bias used for the artificial neural network 100 to process data. The activation may be a value acquired by passing a weighted sum of activations received from a previous layer through an activation function, for example, a sigmoid function and a Rectified Linear Unit (ReLU) function.

Figure 2:
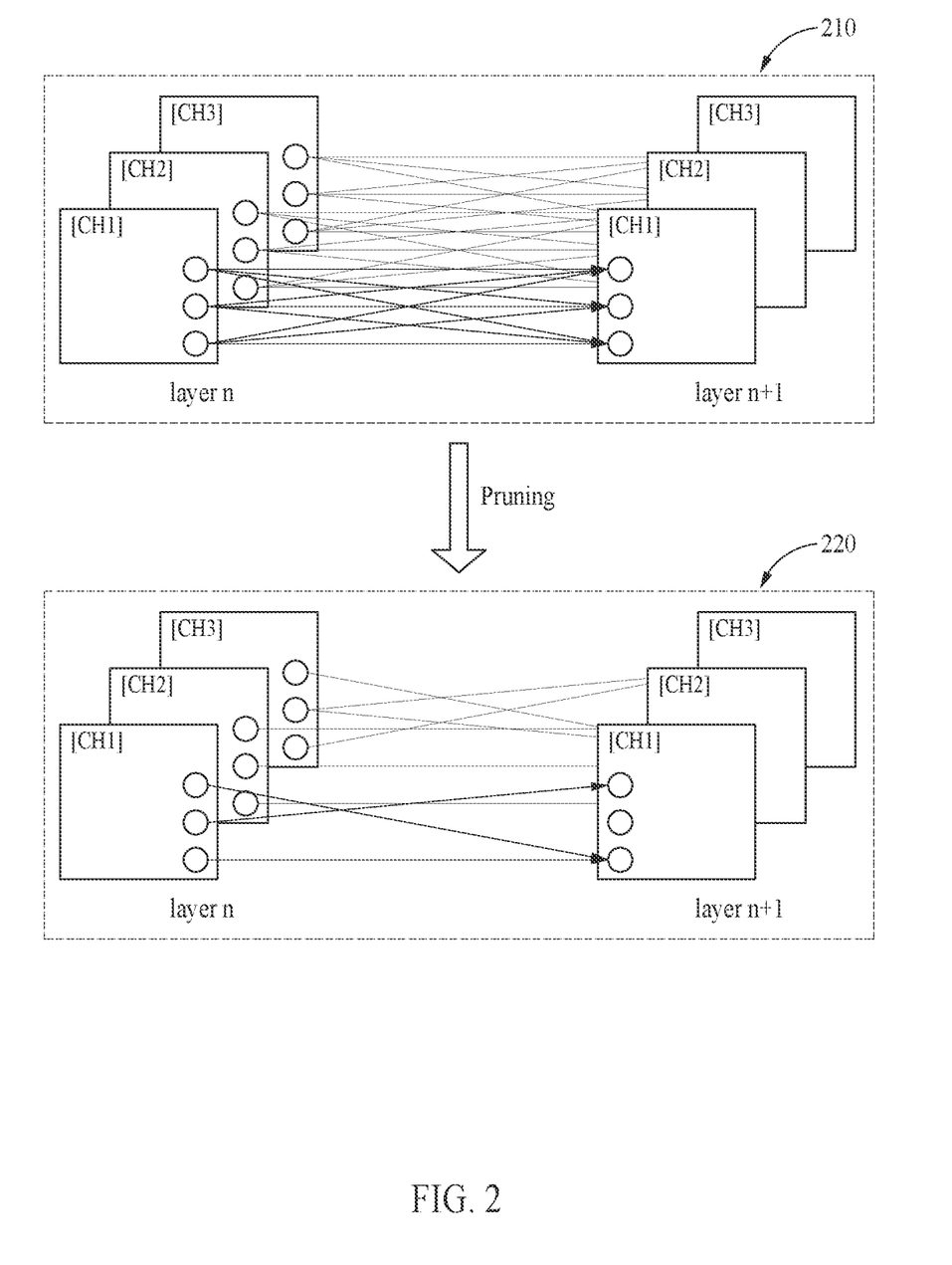
FIG. 2 illustrates an example of pruning.

FIG. 2 illustrates an example of pruning.

In FIG. 2, an artificial neural network 210 may correspond to a portion of layers of an artificial neural network pre-trained (or previously trained) before pruning, and an artificial neural network 220 may correspond to a portion of corresponding layers of a pruned artificial neural network.

Referring to FIG. 2, in the artificial neural network 210, a connection relation may be formed between all of the two node combinations included in three channels included in each of two adjacent different layers. For example, each of the nodes of a layer of a channel may be connected to each of the nodes of a subsequent layer of the channel.

In FIG. 2, the pretrained artificial neural network 210 may be fully connected and a weight representing connection strength between two nodes belonging to different layers included in the artificial neural network 210 may be a value greater than 0. When the connectivity is present between nodes of all of the adjacent layers, the entire complexity of the artificial neural network 210 increases. Also, due to an over-fitting issue, a prediction result of the artificial neural network 210 may have a degraded accuracy and confidence.

To reduce the complexity and/or the over-fitting, pruning on the artificial neural network 210 may be performed. For example, when a weight of a preset threshold or less is present among a plurality of weights in the artificial neural network 210 before pruning, pruning of weakening or removing the corresponding weight may be performed.

To determine a portion of the artificial neural network 210 that may be pruned, the artificial neural network 210 may be explored. Here, the artificial neural network 210 may be pruned by removing or reducing portions of parameters or channels of a layer of the artificial neural network 210 that do not substantially damage or degrade accuracy of the artificial neural network 210.

Pruning may be performed on each channel of a layer of the artificial neural network 210 that does not substantially affect output of the artificial neural network 210. For example, pruning may be performed on one or more input feature maps of each channel of a layer that does not substantially affect an output feature map generated by each channel of the layer.

Connections between nodes of which weights have a value less than a specified threshold may be determined and retrieved. Connection relations corresponding to all of the weights identified or determined as having a value less than the threshold may be removed or completely zeroed, or otherwise, may be ignored.

When the weights are small (for example, when the weights are less than a specified lower limit threshold), a corresponding channel of the artificial neural network 210 may be detected. In this case, the detected channel may be selected as a candidate to be removed from the artificial neural network 210.

Pruning may include degrading precision of a numerical form of at least one numerical value of the artificial neural network 210. For example, whether precision of a numerical form used for weights may decrease may be determined by analyzing at least one weight in a channel of each of a plurality of layers of the artificial neural network 210. Since precision of used numerical forms decreases, lower precision arithmetic hardware may be sequentially used. Low precision arithmetic hardware may be more power efficient and densely embedded than high precision arithmetic hardware. By using a minimum number of bits required to indicate the precision and scope of parameters, the artificial neural network of one or more embodiments may achieve relatively high performance (for example, a fast running time and/or low power consumption) compared to a typical artificial neural network that uses a greater number of bits than necessary.

Also, the pruning method of one or more embodiments may prune a specific channel itself among a plurality of channels at a slight loss of accuracy. In one example, the entire channel in which channel elements occupy 0 at a ratio of a threshold or more, among a plurality of channels, may be pruned. For example, when most of values of channel 5 of layer 2 converge to 0 and a data number is small, the corresponding channel itself may be pruned.

A weight of the artificial neural network 220 may be converted by applying a weight conversion function to the artificial neural network 210 before pruning as represented as the following Equation 2, for example.

$$w_{n,c,m}^t = g(w_{n,c,m}, \alpha_{n,c}, \beta_{n,c}) \cdot w_{n,c,m} \quad \text{Equation 2:}$$

In Equation 2, $w_{n,c,m}$ denotes a weight of an artificial neural network before pruning (for example, the artificial neural network 210), $w'_{n,c,m}$ denotes a weight of an artificial neural network after pruning (for example, the artificial neural network 220), n denotes a corresponding layer index, c denotes a corresponding channel index, m denotes a corresponding weight index, and g denotes a weight conversion function.

The weight conversion function g may be represented as the following Equation 3, for example.

$$g(w_{n,c,m}, \alpha_{n,c}, \beta_{n,c}) = \frac{1}{1 + \alpha_{n,c}^2 \exp(-\beta_{n,c}^2 w_{n,c,m}^2)} \quad \text{Equation 3}$$

In Equation 3, $\beta_{n,c}$ denotes a threshold determination variable and $\alpha_{n,c}$ denotes a variable to determine a gradient at which the weight conversion function varies around the threshold. Here, $\alpha_{n,c}$ and $\beta_{n,c}$ may be referred to as a pruning parameter and the pruning parameter may be determined for each channel of a corresponding layer. For example, $\alpha_{n,c}$ and $\beta_{n,c}$ may be a pruning parameter corresponding to a $c^{th}$ channel of an $n^{th}$ layer.

As α increases, a value of the weight conversion function may gradually vary based on the threshold. As β increases, an area of weights converted to a value close to 0 may decrease. When a value of the weight conversion function is less than or equal to a desired value, a weight value may be converted to 0.

For example, in a weight area in which a value of $$g(w_{n,c,m}, \alpha_{n,c}, \beta_{n,c}) = \frac{1}{1 + \alpha_{n,c}^2 \exp(-\beta_{n,c}^2 w_{n,c,m}^2)}$$

is less than 0.5, the weight conversion function $g(w_{n,c,m}, \alpha_{n,c}, \beta_{n,c})=0$.

The weight conversion function g may have various forms and it may be understood, after an understanding of the present disclosure, that other applicable functions are within the scope of this disclosure.

A channel-by-channel pruning parameter may be determined through learning. The learning of an artificial neural network may be performed to determine a model parameter that minimizes a loss function. The loss function may be determined as an index to determine an optimal model parameter during a learning process of the artificial neural network. In one example, the artificial neural network may be trained based on the loss function as represented as Equation 4 below.

$$L' = (1-\lambda)L + \frac{\lambda}{2}\sum_{k=1}^{N}\sum_{c=1}^{C}|\alpha_{k,c}|^{\eta} + \frac{\lambda}{2}\sum_{k=1}^{N}\sum_{c=1}^{C}|\beta_{k,c}|^{\eta}, \quad \text{Equation 4}$$

where $0<\lambda<1$, $0<\eta<\infty$

In Equation 4, L' denotes the loss function, L denotes a task accuracy, $\lambda$ denotes a learning weight, N denotes a number of layers, and C denotes a number of channels.

Referring to Equation 4, a ratio between the task accuracy and a pruning amount may be determined based on the learning weight $\lambda$. For example, as the learning weight $\lambda$ becomes closer to 1, the pruning amount may increase and the task speed may increase, which may lead to a degradation in the task accuracy. In contrast, as the learning weight $\lambda$ becomes closer to 0, the task accuracy may be improved and the pruning amount may decrease, which may lead to a decrease in the task speed. Hereinafter, a method of determining a learning weight and a pruning parameter and pruning an artificial neural network based on the determined learning weight and pruning parameter is described with reference to FIGS. 3 to 6, as non-limiting examples.

Figure 3:
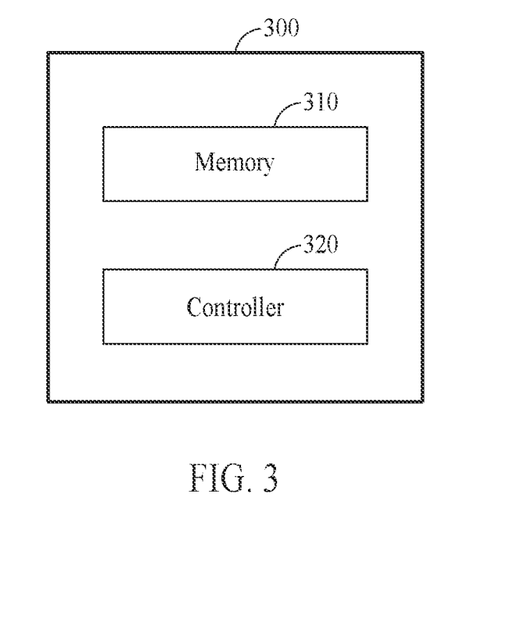
FIG. 3 illustrates an example of an apparatus for pruning an artificial neural network.

FIG. 3 illustrates an example of an apparatus (for example, an apparatus 300) for pruning an artificial neural network.

Referring to FIG. 3, the apparatus 300 may include a memory 310 (for example, one or more memories) and a controller 320 (for example, one or more processors).

The apparatus 300 may include the memory 310 and the controller 320 connected to the memory 310 through a system bus or another appropriate circuit.

The apparatus 300 may store instructions in the memory 310. The controller 320 may process an operation of pruning the artificial neural network by executing the instructions called from the memory 310 through the system bus.

The memory 310 may include a local memory or at least one physical memory device, such as at least one bulk storage device. Here, the local memory may include a random access memory (RAM) or other volatile memory devices generally used during actual execution of the instructions. The bulk storage device may be implemented as a hard disk drive (HDD), a solid state drive (SSD), or other non-volatile memory devices. Also, the apparatus 300 may include at least one cache that provides a temporary storage space of at least a partial instruction to reduce a number of times bulk storage devices conduct a search for instructions while performing a pruning operation.

In response to execution of executable instructions stored in the memory 310 by the apparatus 300, the controller 320 may perform various operations disclosed herein. For example, the memory 310 may store instructions such that the controller 320 may perform at least one operation described in FIGS. 1, 2, and 4 to 7.

Depending on a specific type of an apparatus to be implemented, the apparatus 300 may include a number of components less than a number of components shown in FIG. 3 or may include additional components not illustrated in FIG. 3. Also, at least one component may be included in another component and may constitute a portion of the other component.

The controller 320 may acquire an initial value of task accuracy for an inference task processed by a pretrained artificial neural network. Hereinafter, the initial value of the task accuracy for the inference task processed by the pretrained artificial neural network may be referred to as first task accuracy.

The artificial neural network may learn a target task and build an inference model. Also, the artificial neural network may output an inference result about an external input value based on the built inference model.

In association with a task performed using the artificial neural network, the artificial neural network may apply to a facial recognition module or software for a smartphone, a recognition/classification operation such as an object recognition, a voice recognition, and an image classification, a medical and diagnostic device, and an unmanned system, and may be implemented as a dedicated processing device configured to extract meaningful information by processing video data.

The controller 320 may acquire the initial value of the task accuracy by evaluating the pretrained artificial neural network. The task accuracy may include a mean squared error (MSE) representing an error between an expected result value and an inference result value by the artificial neural network. Here, the smaller the MSE that is a value corresponding to the task accuracy, the better performance of the artificial neural network.

For example, to measure the task accuracy, the controller 320 may input, to the artificial neural network, a data set for measuring performance of the artificial neural network. The controller 320 may calculate an MSE between an expected result value and a result value inferred using the artificial neural network based on the input data set, and may determine the task accuracy to be the MSE, to include the MSE, or based on the MSE. Here, the data set may be differently determined based on a field of a task desired by the artificial neural network. For example, a data set, such as cifar-10 and cifar-100, may be used in an image classification field.

The controller 320 may acquire, as the initial value of the task accuracy, task accuracy of the pretrained artificial neural network before performing pruning. For example, the task accuracy may be calculated by receiving a training data set and by performing evaluation based on a result predicted by the artificial neural network based on the training data set. The task accuracy may be a prediction loss having a smaller value the more accurate the inference result of the artificial neural network. In addition thereto, the task accuracy may be measured using various methods. The controller 320 may evaluate the artificial neural network multiple times and acquire the task accuracy based on the average of the multiple evaluation results.

The controller 320 may prune the artificial neural network based on a channel unit by adjusting weights between nodes belonging to channels according to a preset learning weight based on a channel-by-channel pruning parameter corresponding to a channel of each of a plurality of layers that constitutes the pretrained artificial neural network. For example, the controller 320 may prune the artificial neural network by adjusting at least a portion of connections between nodes belonging to channels used to transmit and receive channel information of each of the plurality of layers of the pretrained artificial neural network.

Here, the controller 320 may acquire or determine information about connections between channels included in the plurality of layers that constitutes the pretrained artificial neural network. That is, the controller 320 may acquire or determine information of channels included in each of the plurality of layers of the multi-layered artificial neural network and information about connections between the channels included in the plurality of layers. Also, the information about the connections may include information about weights of connections between adjacent layers among the plurality of layers.

The controller 320 may prune the artificial neural network by adjusting at least a portion of the connections between the channels included in the layers of the artificial neural network. For example, the controller 320 may compress the artificial neural network through a pruning operation of adjusting weights of connections of the artificial neural network. Description related to pruning made above with reference to FIG. 2 may apply here.

The controller 320 may determine a learning weight of the artificial neural network based on the initial value of the task accuracy and the task accuracy of the pruned artificial neural network. Here, when the task accuracy of the pruned artificial neural network is less than the initial value, the controller 320 may determine the learning weight to increase the task accuracy. That is, when an inference task accuracy determined based on the task accuracy of the pruned artificial neural network is less than an inference task accuracy of the before pruning artificial neural network determined based on the initial value of the task accuracy, the learning weight may decrease to prevent degradation in the performance of the inference task. For example, when a value of task accuracy is proportional to the performance of the inference task, the controller 320 may determine that a value of task accuracy of the pruned artificial neural network is less than a value of task accuracy before pruning and, accordingly, may decrease the learning weight. On the contrary, when a value of task accuracy is inversely proportional to the performance of the inference task, the controller 320 may determine that a value of task accuracy of the pruned artificial neural network is less than a value of task accuracy before pruning and, accordingly, may increase the learning weight.

The learning weight may represent a degree of pruning performed compared to a time in which one-time pruning is performed. An amount of time used to perform one-time pruning may be identical for each apparatus that performs pruning. Therefore, as the learning weight increases, an amount of information pruned in each pruning stage may increase.

The controller 320 may update the channel-by-channel pruning parameter based on the determined learning weight and the task accuracy of the pruned artificial neural network. For example, the controller 320 may determine a loss function based on a variable used to determine a threshold of a weight that is used as a standard for performing, the determined pruning weight, and the task accuracy of the pruned artificial neural network and may update a threshold determination variable to decrease the loss function.

The controller 320 may reprune the pruned artificial neural network based on the channel unit according to the updated learning weight based on the updated channel-by-channel pruning parameter. The controller 320 may repeatedly perform a pruning-evaluation operation of repruning the artificial neural network and determining a task accuracy of the repruned artificial neural network and a learning weight of the repruned artificial neural network. Here, the controller 320 may determine whether to additionally perform the pruning-evaluation operation based on a preset epoch and the task accuracy of the repruned artificial neural network. The pruning-evaluation operation may be a unit to measure one-time pruning and task accuracy.

The controller 320 may compare the determined learning weight to a lower limit threshold of the learning weight in response to repeatedly performing the pruning-evaluation operation. The controller 320 may determine whether to terminate a current pruning session and to initiate a subsequent pruning session in which the learning weight is set as an initial reference value based on a result of the comparing. For example, when it is determined that the determined learning weight is less than or equal to the lower limit threshold of the learning weight, the controller 320 may terminate the current pruning session, may set the learning weight as the initial reference value, and may initiate the subsequent pruning session. Here, by terminating the current pruning session, the controller 320 may store information about the artificial neural network pruned during the current pruning session. By terminating each of a plurality of pruning sessions, the controller 320 may determine an optimal pruning method by comparing the stored performances of the artificial neural network. A session may be a unit until the pruning weight is updated to an initial value according to a plurality of pruning-evaluation operations.

The controller 320 may perform the pruning-evaluation operation and, accordingly, may acquire the task accuracy of the pruned or repruned artificial neural network. For example, every time the controller 320 performs each of a plurality of pruning-evaluation operations performed during an individual session, the controller 320 may acquire and/or store a task accuracy and calculate the average task accuracy every individual session. The average task accuracy calculated in one session may be used as a comparison standard to determine a learning weight in a subsequent session.

Figure 4:
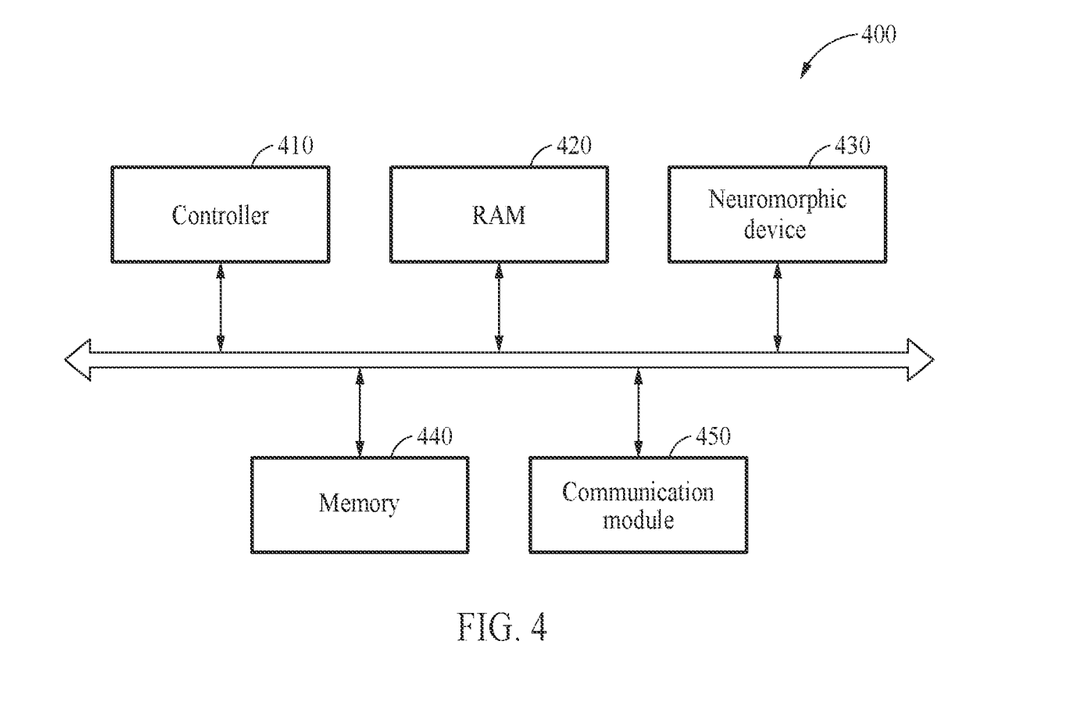
FIG. 4 illustrates an example of an electronic system.

FIG. 4 illustrates an example of an electronic system.

Referring to FIG. 4, an electronic system 400 may analyze input data in real time based on an artificial neural network, extract valid information, and determine a situation based on the extracted information and/or control components of an electronic device to which the electronic system 400 is mounted. For example, the electronic system 400 may be, or be included in, a drone, a robot apparatus such as an Advanced Drivers Assistance System (ADAS), a smart TV, a smartphone, a medical device, a mobile device, a video display device, a measurement device, and an Internet of things (IoT) device, and in addition thereto, may be mounted to at least one of various types of electronic devices.

Referring to FIG. 4, the electronic system 400 may include a controller 410 (for example, one or more processors), a RAM 420, a neuromorphic device 430, a memory 440 (for example, one or more memories), and a communication module 450. A portion of hardware components of the electronic system 400 may be mounted to at least one semiconductor chip.

The controller 410 may control the overall operation of the electronic system 400. The controller 410 may include a single core or a multicore. The controller 410 may process or executes programs and/or data stored in the memory 440. The controller 410 may control a function of the neuromorphic device 430 by executing the programs stored in the memory 440. Also, the controller 410 may perform pruning of decreasing a weight information amount used by the neuromorphic device 430. The controller 410 may be implemented as a central processing unit (CPU), a graphics processing unit (GPU), an access point (AP), and the like.

The controller 410 and the memory 440 of FIG. 4 may correspond to the controller 320 and the memory 310 of FIG. 3, respectively.

The RAM 420 may temporarily store programs, data, or instructions. For example, the programs and/or the data stored in the memory 440 may be temporarily stored in the RAM 420 according to control of the controller 410 or a booting code. The RAM 420 may be implemented as a memory, such as a dynamic RAM (DRAM) or a static RAM (SRAM).

The neuromorphic device 430 may perform an operation based on input data being received and generate an information signal based on a result of the performing. The neuromorphic device 430 may correspond to a hardware accelerator dedicated for an artificial neural network or an apparatus including the same.

The information signal may include one of various types of recognition signals (for example, any one of a voice recognition signal, an object recognition signal, a video recognition signal, and a biological information recognition signal). For example, the neuromorphic device 430 may receive, as input data, frame data included in a video stream and may generate a recognition signal about an object included in an image represented by the frame data from the frame data. However, it is provided as an example only. The neuromorphic device 430 may receive various types of input data and may generate a recognition signal according to the input data based on a type or a function of an electronic device to which the electronic system 400 is mounted.

The memory 440 may be a storage configured to store data and stores an OS, various types of programs, and various types of data. Depending on examples, the memory 440 may store intermediate results generated during an operation performing process of the neuromorphic device 430 or weights used during the operation performing process.

The memory 440 may be a DRAM, but it is provided as an example only. The memory 440 may include any one or any combination of a volatile memory and a non-volatile memory. Examples of the non-volatile memory include ROM, random-access programmable read only memory (PROM), erasable programmable read-only memory (EPROM), electrically erasable programmable read-only memory (EEPROM), flash memory, PRAM, MRAM, RRAM, FRAM, and the like. Examples of the non-volatile memory include DRAM, SRAM, SDRAM, PRAM, MRAM, RRAM, FeRAM, and the like. Depending on examples, the memory 440 may include any one or any combination of HDD, SSD, CF, SD, micro-SD, mini-SD, xD, and a memory stick.

The communication module 450 may include various types of wired or wireless interfaces capable of communicating with an external apparatus. For example, the communication module 450 may include a wired local area network (LAN), a wireless local area network (WLAN) such as wireless fidelity (Wi-Fi), a wireless personal area network (WPAN) such as Bluetooth, a wireless universal serial bus (USB), ZigBee, near field communication (NFC), radio-frequency identification (RFID), power line communication (PLC), a communication interface accessible to a mobile cellular network, such as 3rd Generation (3G), 4th Generation (4G), and Long Term Evolution (LTE), and the like.

Figure 5:
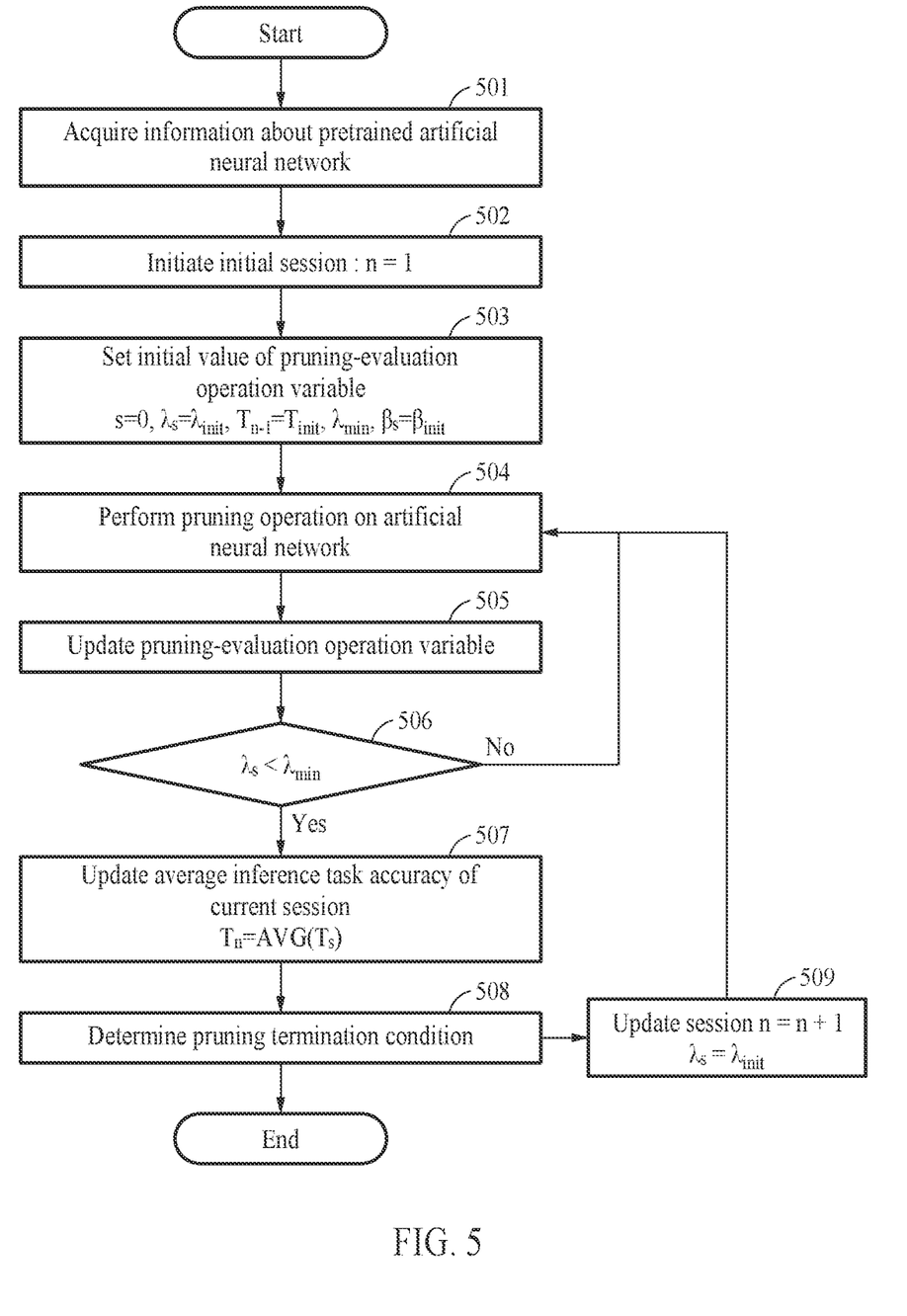
FIG. 5 is a flowchart illustrating an example of a pruning algorithm performed by an apparatus for pruning an artificial neural network.

FIG. 5 is a flowchart illustrating an example of a pruning algorithm performed by an apparatus for pruning an artificial neural network.

A process of FIG. 5 may be performed by either one or both of the apparatus 300 for pruning the artificial neural network of FIG. 3 and the electronic system 400 of FIG. 4.

In the following, numerical values, the range of variables, and equations used in FIGS. 5 and 6 may be modified within the range easily derivable after an understanding of the present disclosure, and the modified numerical values belong to the scope of the disclosure.

Referring to FIG. 5, in operation 501, the apparatus may acquire information about a pretrained artificial neural network. As described above, information about the artificial neural network may be, or include, weights between a plurality of nodes belonging to the respective channels included in adjacent layers among multiple layers.

In operation 502, the apparatus may initiate an initial session. Here, an index n used to identify a session may be set to 1.

In operation 503, the apparatus may set an initial value of a pruning-evaluation operation variable. For example, the apparatus may set, to 0, s that is an index representing a number of pruning-evaluation operations repeated in each session.

Also, the apparatus may set $\lambda_s$ that represents a learning weight to $\lambda_{init}$ that is an initial reference weight value.

For example, $\lambda_{init}$ may represent a maximum value within the available range of the learning weight. As another example, $\lambda_{init}$ may be a random value within the available range of the learning weight. For example, the learning weight $\lambda_s$ may have a value from 0 to 1. Here, $\lambda_{init}$ may be 1. However, it is provided as an example only.

Also, the apparatus may set the average task accuracy $T_{n-1}$ for each session. Here, that the subscript is not n but n−1 represents that the average task accuracy of a previous session is used as a comparison standard with a task accuracy of a current session. However, it is provided as an example only. The task accuracy that is the comparison standard may be determined using various methods.

For example, the apparatus may repeatedly perform evaluation based on a training data set predetermined for a pretrained artificial neural network before pruning and then may determine an average of derived evaluation results as $T_{init}$. The task accuracy may be determined by the apparatus. As another example, the task accuracy may be determined by an external apparatus in which the artificial neural network is implemented or another external apparatus and then, the apparatus may acquire the learning accuracy from the external device.

Also, the apparatus may acquire a lower limit threshold $\lambda_{min}$ of the learning weight that is a termination standard of each session. For example, the lower limit threshold $\lambda_{min}$ may be a value close to a lower limit value that is determined based on the available range and lower limit value of the learning weight. For example, the learning weight $\lambda$ may have a value from 0 to 1. Here, $\lambda_{min}$ may be $10^{-20}$. However, it is provided as an example only.

Also, the apparatus may set, as an initial value, a threshold determination variable $\beta_s$ to determine a threshold of a weight that is used as a standard for performing pruning as an example of pruning. Here, $\beta_s$ may determine a size of the threshold of the weight as a variable of a weight conversion function that converts an existing weight through pruning. For example, as $\beta_s$ increases, the threshold increases and probabilistically more weights may be pruned or converted to 0 or converted to a smaller weight value.

In operation 504, the apparatus may perform a pruning operation on the artificial neural network based on the pruning-evaluation operation variable.

For example, the apparatus may acquire information about values of all of weights or at least a portion of the weights for each adjacent layer of the artificial neural network and may perform pruning based on the predetermined learning weight $\lambda_s$ and the pruning parameter (where the pruning parameter includes the threshold determination variable $\beta_s$, for example).

In operation 504, when a weight value of the pretrained artificial neural network or the pruned artificial neural network in the previous pruning-evaluation operation is less than a reference threshold of pruning, the apparatus may convert the corresponding weight value to 0 or may decrease the weight value to a smaller value. Also in operation 504, when the weight value of the pretrained artificial neural network or the pruned artificial neural network in the previous pruning-evaluation operation is greater than the reference threshold of pruning, the apparatus may convert the corresponding weight value to 1 or may increase the corresponding value to a larger value.

In operation 505, the apparatus may update the pruning-evaluation operation variable (the learning weight $\lambda_s$, for example). A method of updating the pruning-evaluation operation variable is further described with reference to FIG. 6, as a non-limiting example.

In operation 506, the apparatus may determine whether the updated learning weight $\lambda_s$ is less than the lower limit threshold $\lambda_{min}$ of the learning weight.

When it is determined that the updated learning weight $\lambda_s$ is greater than or equal to the lower limit threshold $\lambda_{min}$ of the learning weight in operation 506, the apparatus may return to operation 504 and perform a subsequent procedure.

When it is determined that the updated learning weight $\lambda_s$ is less than the lower limit threshold $\lambda_{min}$ of the learning weight in operation 506, the apparatus may perform a session termination procedure. Due to a degradation in the task accuracy of the pruned artificial neural network, a pruning progress speed may decrease. Accordingly, the apparatus may terminate a current session n and increases the learning weight $\lambda_s$ and then proceeds with a subsequent session n+1.

In operation 507, the apparatus may update the average inference task accuracy of the current session that is a comparison standard for evaluating a task accuracy of a pruned artificial neural network in the subsequent session n+1. For example, the apparatus may update the inference task accuracy in the session n with the average task accuracy acquired every time the pruning-evaluation operation is performed a preset number of times in the current session n. For example, the apparatus may update the inference task accuracy according to the following Equation 5.

$$T_n = \text{AVG}(T_s) \qquad \text{Equation 5:}$$

In Equation 5, $T_n$ denotes the inference task accuracy in the session n, AVG denotes an operator for calculating the average, and $T_s$ denotes a summated value of task accuracy of the pruned artificial neural network acquired in the session n. It will be understood after an understanding of the present disclosure that any method of calculating an inference task accuracy that is a comparison standard of task accuracy in the subsequent session n=1 in various manners in addition to the simple averaging method is within the scope of the disclosure.

In operation 508, the apparatus may determine whether to additionally perform the pruning-evaluation operation based on a preset epoch and the task accuracy of the repruned artificial neural network.

For example, in operation 508, when at least a preset ratio (e.g., 70%) of the entire artificial neural network is pruned or when the artificial neural network is trained by the preset epoch, the apparatus may terminate the pruning operation. Here, the pruned degree may be determined based on the task accuracy of the repruned artificial neural network. The higher the task accuracy of the repruned artificial neural network, the lower the pruned degree, for example. The lower the task accuracy of the repruned artificial neural network, the higher the pruned degree, for example.

In operation 509, the apparatus may store information about the pruned artificial neural network in the session n before updating the session. Also in operation 509, the apparatus may increase the degraded learning weight $\lambda$s. For example, the apparatus may set $\lambda_s$ as $\lambda_{init}$ that is an initial reference weight value.

Figure 6:
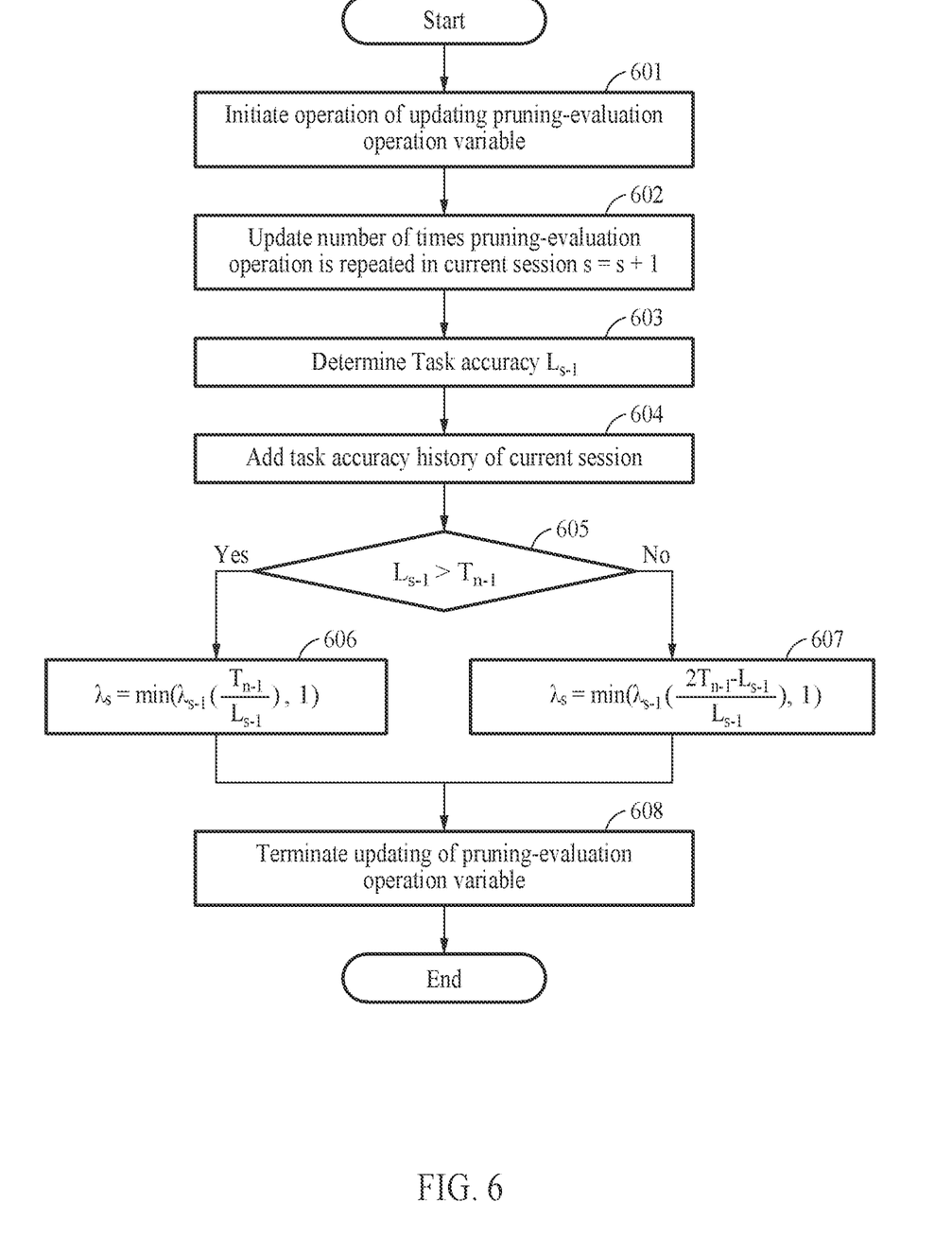
FIG. 6 is a flowchart illustrating an example of an operation of updating a pruning-evaluation operation variable performed by an apparatus for pruning an artificial neural network.

FIG. 6 is a flowchart illustrating an example of an operation of updating a pruning-evaluation operation variable performed by an apparatus for pruning an artificial neural network.

A process of FIG. 6 may be performed by either one or both of the apparatus 300 for pruning the artificial neural network of FIG. 3 and the electronic system 400 of FIG. 4. In a non-limiting example, the operations of FIG. 6 may correspond to operation 505 of FIG. 5.

Referring to FIG. 6, in operation 601, the apparatus may initiate an operation of updating a pruning-evaluation operation variable.

In operation 602, the apparatus may update s that represents a number of times a pruning-evaluation operation is repeated in the session n with s+1. Hereinafter, s denotes the updated value.

In operation 603, the apparatus may determine task accuracy $L_{s-1}$. For example, $L_{s-1}$ may be determined based on evaluation performed for the pruned artificial neural network. As described above, as the inference is more accurate, a value of the task accuracy $L_{s-1}$ may decrease.

The task accuracy $L_{s-1}$ may be, for example, a prediction loss. However, it is provided as an example only.

In operation 604, the apparatus may add a task accuracy history in the current session n. For example, the apparatus may store $L_{s-1}$ that is used to determine the average inference task accuracy $T_n$ for each session described in FIG. 5.

In operation 605, the apparatus may determine whether a value of the task accuracy $L_{s-1}$ is greater than a value of the average inference task accuracy $T_{n-1}$ in the previous session n−1.

When a task accuracy of the pruned artificial neural network (the task accuracy $L_{s-1}$, for example) is less than an initial value or inference task accuracy of a previous session (the average inference task accuracy $T_{n-1}$, for example), the apparatus may determine the learning weight to increase the task accuracy.

When it is determined that the value of the task accuracy $L_{s-1}$ is greater than the value of the average inference task accuracy $T_{n-1}$ in the previous session n−1 in operation 605, the apparatus may update the learning weight $\lambda_s$ according to the following Equation 6 in operation 606, for example.

$$\lambda_s = \min\left(\lambda_{s-1}\left(\frac{T_{n-1}}{L_{s-1}}\right), 1\right) \qquad \text{Equation 6}$$

When it is determined that the value of the task accuracy $L_{s-1}$ is less than or equal to the value of the average inference task accuracy $T_{n-1}$ in the previous session n−1 in operation

605, the apparatus may update the learning weight $\lambda_s$ according to the following Equation 7 in operation 607, for example.

$$\lambda_s = \min\left(\lambda_{s-1}\left(\frac{2T_{n-1} - L_{s-1}}{L_{s-1}}\right), 1\right) \quad \text{Equation 7}$$

Here, threshold determination variable $\beta_{n,c}$, and variable $\alpha_{n,c}$ to determine a gradient at which a weight conversion function varies around the threshold (the pruning parameter, for example) may be determined based on the learning weight $\lambda_s$ and the task accuracy $L_{s-1}$.

In operation 608, the apparatus may terminate updating of the pruning-evaluation operation variable.

In general, according to an increase in a pruning rate of the artificial neural network, accuracy of the artificial neural network may decrease. According to the examples of FIGS. 4 to 6, variables required to perform pruning may be determined based on data acquired by the apparatus and equations. That is, according to an algorithm that minimizes pruning cost, a fine tuning or a method of manually setting a major parameter having a relatively high sensitivity is not required to determine an optimal pruning. Accordingly, the apparatus of one or more embodiments may reduce an amount of time and cost used for pruning, which may lead to improving the efficiency of pruning.

Figure 7:
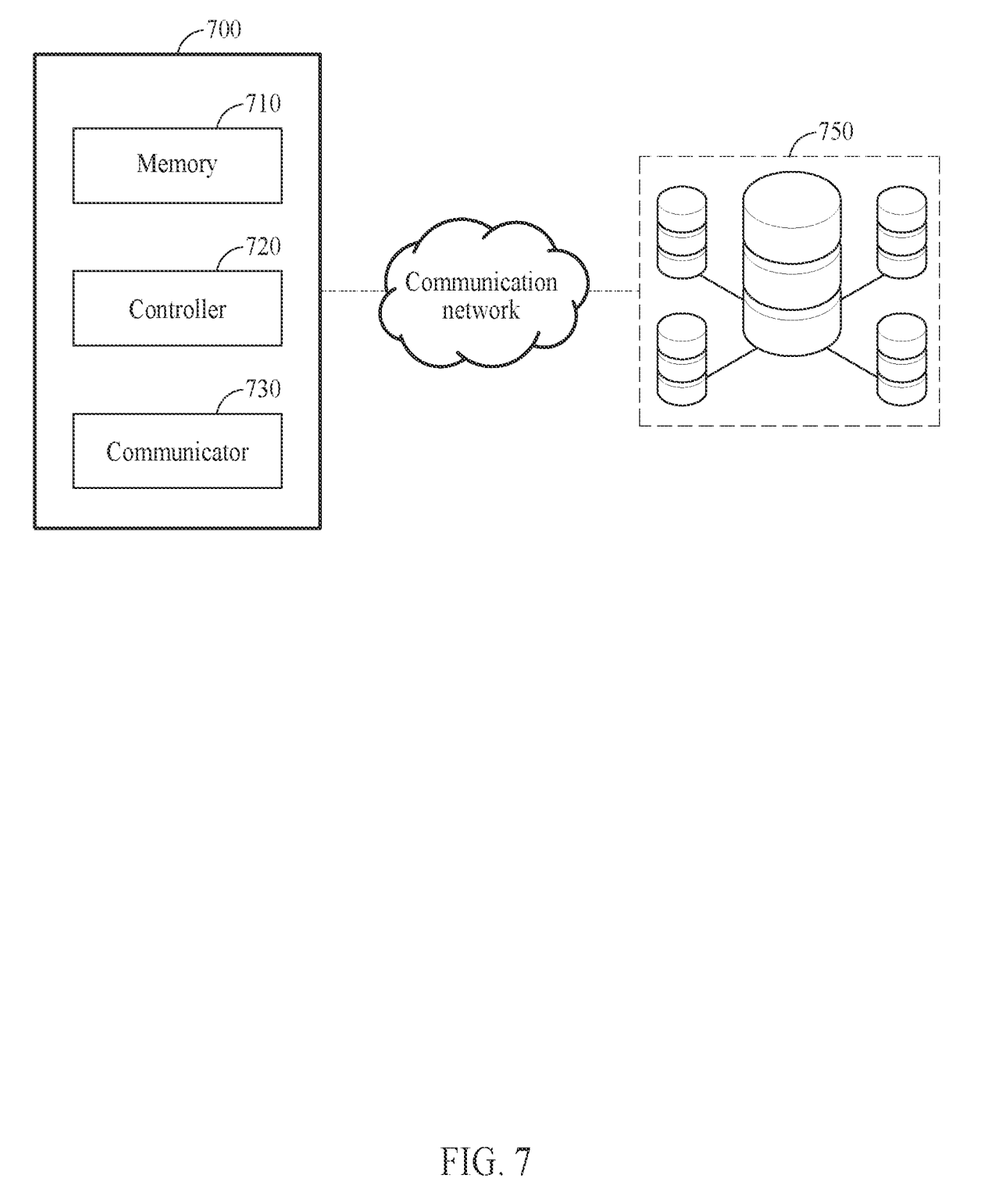
FIG. 7 illustrates an example of a system that includes an artificial neural network and an apparatus for pruning the artificial neural network.

FIG. 7 illustrates an example of a system that includes an artificial neural network (for example, an artificial neural network 750) and an apparatus (for example, an apparatus 700) for pruning the artificial neural network.

For example, the artificial neural network 750 may refer to an apparatus included in an external server and/or a database of the apparatus 700.

Referring to FIG. 7, the apparatus 700 may include a memory 710 (for example, one or more memories), a controller 720 (for example, one or more processors), and a communicator 730.

Description related to the memory 310 and the controller 320 of FIG. 3 may apply to the memory 710 and the controller 720 of FIG. 7, without departing from the scope of the example of FIG. 7.

The apparatus 700 may form a communication network with the artificial neural network 750 through the communicator 730.

The apparatus 700 may acquire information about the artificial neural network 750 from the artificial neural network 750 through the communicator 730. In performing a pruning operation, the apparatus 700 may access information about the artificial neural network 750 through the communicator 730. Therefore, there is no need to store information about the artificial neural network 750 in the memory 710.

Also, the apparatus 700 may be implemented in various manners. For example, the apparatus 700 may be implemented by implementing the apparatus 700 in a user terminal and by acquiring a pruned artificial neural network through access to an external artificial neural network. As another example, the artificial neural network 750 and the apparatus 700 may be integrally implemented in the user terminal. As another example, the apparatus 700 and the artificial neural network 750 may be implemented separate from the user terminal and the user terminal may acquire only the pruned artificial neural network 750 by the apparatus 700.

The apparatuses, memories, controllers, electronic systems, controllers, RAMs, neuromorphic devices, memories, communication modules, communicators, apparatus 300, memory 310, controller 320, electronic system 400, controller 410, RAM 420, neuromorphic device 430, memory 440, communication module 450, apparatus 700, memory 710, controller 720, communicator 730, and other apparatuses, units, modules, devices, and components described herein with respect to FIGS. 1-7 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A neural network pruning method, the method comprising:
    acquiring a first task accuracy of an inference task processed by a pretrained neural network;
    pruning, based on a channel unit, the neural network by adjusting weights between nodes of channels based on a preset learning weight and based on a channel-by-channel pruning parameter corresponding to a channel of each of a plurality of layers of the pretrained neural network;
    updating the learning weight based on the first task accuracy and a task accuracy of the pruned neural network;
    updating the channel-by-channel pruning parameter based on the updated learning weight and the task accuracy of the pruned neural network;
    repruning, based on the channel unit, the pruned neural network based on the updated learning weight and based on the updated channel-by-channel pruning parameter;
    repeatedly performing a pruning-evaluation operation of determining a task accuracy of the repruned neural network and a learning weight of the repruned neural network;
    comparing the determined learning weight to a lower limit threshold of the learning weight, in response to repeatedly performing the pruning-evaluation operation; and
    determining whether to terminate a current pruning session and to initiate a subsequent pruning session in which the learning weight is set as an initial reference value, based on a result of the comparing.

2. The method of claim 1, wherein the channel-by-channel pruning parameter comprises a first parameter used to determine a threshold of pruning.

3. The method of claim 1, wherein the pruning comprises:
    pruning a channel among the channels in which channel elements occupy 0 at a ratio of a threshold or more, among the channels.

4. The method of claim 1, wherein the updating of the learning weight comprises updating the learning weight such that the task accuracy of the pruned neural network increases, in response to the task accuracy of the pruned neural network being less than the first task accuracy.

5. The method of claim 1, further comprising:
    determining whether to additionally perform the pruning-evaluation operation based on a preset epoch and the task accuracy of the repruned neural network.

6. A non-transitory computer-readable storage medium storing instructions that, when executed by a processor, configure the processor to perform the method of claim 1.

7. A neural network pruning apparatus, the apparatus comprising:
a processor configured to:
acquire a first task accuracy of an inference task processed by a pretrained neural network;
prune, based on a channel unit, the neural network by adjusting weights between nodes of channels based on a preset learning weight and based on a channel-by-channel pruning parameter corresponding to a channel of each of a plurality of layers of the pretrained neural network;
update the learning weight based on the first task accuracy and a task accuracy of the pruned neural network;
update the channel-by-channel pruning parameter based on the updated learning weight and the task accuracy of the pruned neural network;
reprune, based on the channel unit, the pruned neural network based on the updated learning weight and based on the updated channel-by-channel pruning parameter;
repeatedly performing a pruning-evaluation operation of determining a task accuracy of the repruned neural network and a learning weight of the repruned neural network;
comparing the determined learning weight to a lower limit threshold of the learning weight, in response to repeatedly performing the pruning-evaluation operation; and
determining whether to terminate a current pruning session and to initiate a subsequent pruning session in which the learning weight is set as an initial reference value, based on a result of the comparing.

8. The apparatus of claim 7, wherein the channel-by-channel pruning parameter comprises a first parameter used to determine a threshold of pruning.

9. The apparatus of claim 7, wherein, for the pruning, the processor is configured to prune a channel among the channels in which channel elements comprised in the channel occupy 0 at a ratio of a threshold or more, among the channels.

10. The apparatus of claim 7, wherein, for the updating of the learning weight, the processor is configured to update the learning weight such that the task accuracy of the pruned neural network increases in response to the task accuracy of the pruned neural network being less than the first task accuracy.

11. The apparatus of claim 7, wherein the processor is configured to determine whether to additionally perform the pruning-evaluation operation based on a preset epoch and the task accuracy of the repruned neural network.

12. The apparatus of claim 7, further comprising a memory storing instructions that, when executed by the processor, configure the processor to perform the acquiring of the first task accuracy, the pruning of the neural network, the updating of the learning weight, the updating of the channel-by-channel pruning parameter, and the repruning of the pruned neural network.

13. A neural network pruning method, the method comprising:
for each of channels of a pretrained neural network, pruning weights of the channel based on a pruning parameter of the channel and a learning weight;
updating the learning weight based on a comparison of a first accuracy of an inference performed using the pretrained neural network and a second accuracy of an inference performed using the pruned neural network;
for each of the channels, updating the pruning parameter of the channel based on the updated learning weight and the second accuracy;
for each of the channels, repruning the weights of the channel based on the updated pruning parameter of the channel and the updated learning weight;
repeatedly performing a pruning-evaluation operation of determining a task accuracy of the repruned neural network and a learning weight of the repruned neural network;
comparing the determined learning weight to a lower limit threshold of the learning weight, in response to repeatedly performing the pruning-evaluation operation; and
determining whether to terminate a current pruning session and to initiate a subsequent pruning session in which the learning weight is set as an initial reference value, based on a result of the comparing.

14. The method of claim 13, wherein the updating of the learning weight comprises updating the learning weight based on whether the second accuracy is greater than the first accuracy.

15. The method of claim 14, wherein the updating of the learning weight comprises:
decreasing the learning weight in response to the second accuracy being greater than the first accuracy; and
increasing the learning weight in response to the second accuracy being less than or equal to the first accuracy.

16. The method of claim 13, wherein the pruning of the weights comprises:
determining values of a weight conversion function based on the pruning parameter; and
pruning the weights based on the values of the weight conversion function.

17. The method of claim 13, wherein the pruning of the weights comprises pruning a greater amount of the weights in response to the learning weight a first value than in response to the learning weight being a second value less than the first value.

* * * * *